United States Patent [19]

Werner et al.

[11] Patent Number: 5,373,928

[45] Date of Patent: Dec. 20, 1994

[54] CLUTCH PLATE FOR A FRICTION CLUTCH

[75] Inventors: Karl H. Werner, Schweinfurt; Hilmar Goebel, Grafenrheinfeld; Bernhard Schierling, Kürnach, all of Germany

[73] Assignee: Fichtel & Sachs AG, Schweinfurt, Germany

[21] Appl. No.: 21,763

[22] Filed: Feb. 24, 1993

[30] Foreign Application Priority Data

Feb. 29, 1992 [DE] Germany .............................. 4206321

[51] Int. Cl.⁵ .............................................. F16D 69/00
[52] U.S. Cl. .............................. 192/107 R; 192/107 M
[58] Field of Search ........... 192/107 R, 107 C, 107 M

[56] References Cited

U.S. PATENT DOCUMENTS

| | | | |
|---|---|---|---|
| 1,281,219 | 10/1918 | Simpson | 192/107 M |
| 1,780,710 | 11/1930 | Kattwenkel | 192/107 R |
| 2,052,808 | 9/1936 | Spokes | 192/107 M X |
| 2,125,524 | 8/1938 | Smith | 192/107 M |
| 2,175,399 | 10/1939 | Judd | 192/107 M X |
| 2,354,389 | 7/1944 | Lidkea | 192/107 M |
| 2,403,674 | 7/1946 | Miller et al. | 192/107 M |
| 2,992,707 | 7/1961 | Lewis | 192/107 M |
| 3,412,831 | 11/1968 | Marcheron | 192/107 R X |
| 3,891,066 | 6/1975 | Anderson | 192/107 R |
| 4,697,684 | 10/1987 | Maycock et al. | 192/107 R |
| 4,858,731 | 8/1989 | Bush | 192/107 M X |
| 5,052,536 | 10/1991 | Maeda | 192/107 M |

FOREIGN PATENT DOCUMENTS

| | | | |
|---|---|---|---|
| 2608706 | 12/1986 | France . | |
| 2658884 | 8/1991 | France | 192/107 R |
| 2655105 | 8/1978 | Germany . | |
| 3643273 | 6/1988 | Germany . | |
| 0113920 | 5/1987 | Japan | 192/107 M |
| 212220 | 4/1924 | United Kingdom | 192/107 R |
| 0470261 | 8/1937 | United Kingdom . | |
| 0674055 | 6/1952 | United Kingdom . | |
| 0777763 | 6/1957 | United Kingdom . | |
| 1083344 | 9/1967 | United Kingdom . | |
| 1251575 | 10/1971 | United Kingdom . | |

Primary Examiner—Rodney H. Bonck
Attorney, Agent, or Firm—Brumbaugh, Graves, Donohue & Raymond

[57] ABSTRACT

The invention relates to a friction lining of a clutch plate which is constructed with an encircling reinforcing ring to increase the stability of speed. This annular part is arranged outside the wear volume and has a considerably smaller radial dimension than the friction lining.

12 Claims, 2 Drawing Sheets

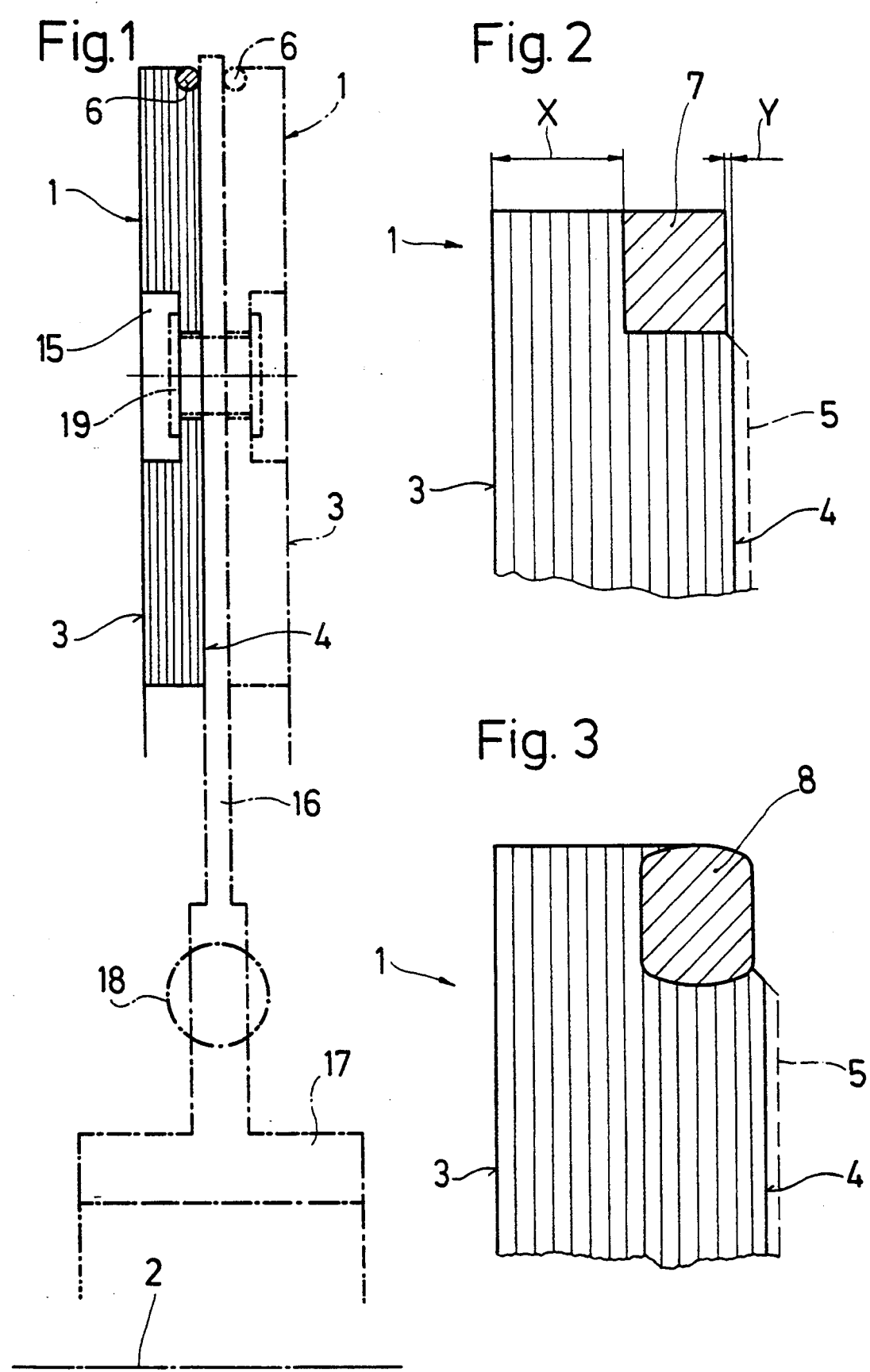

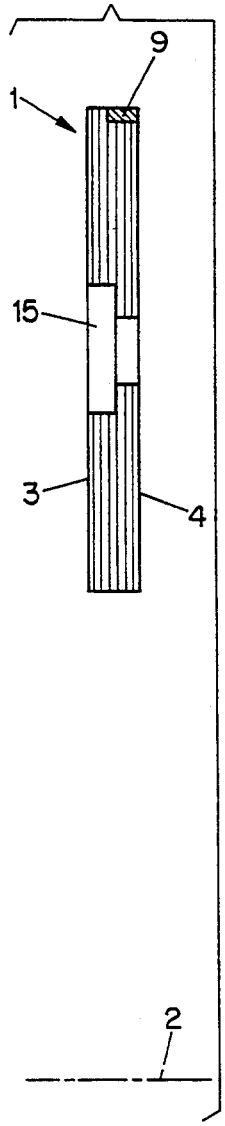
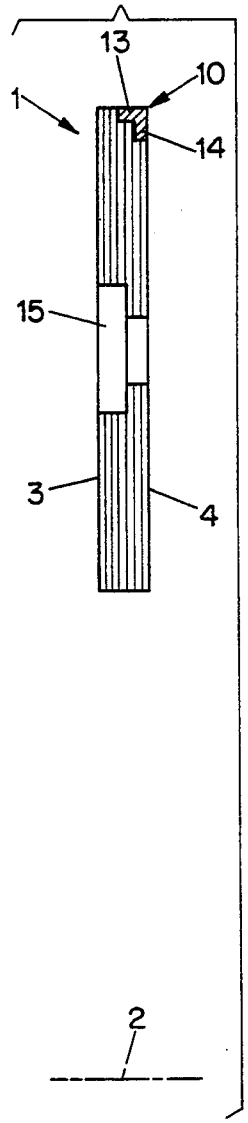
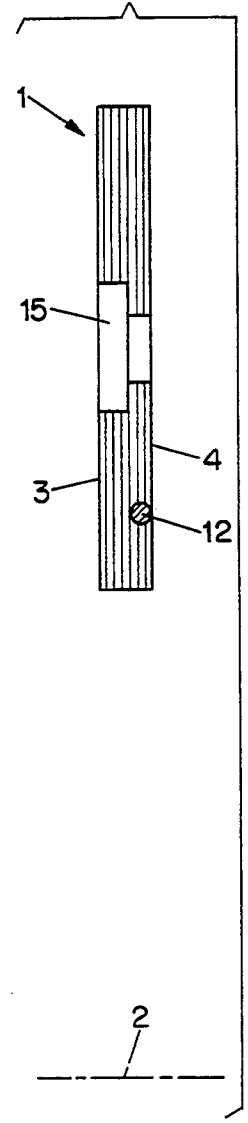
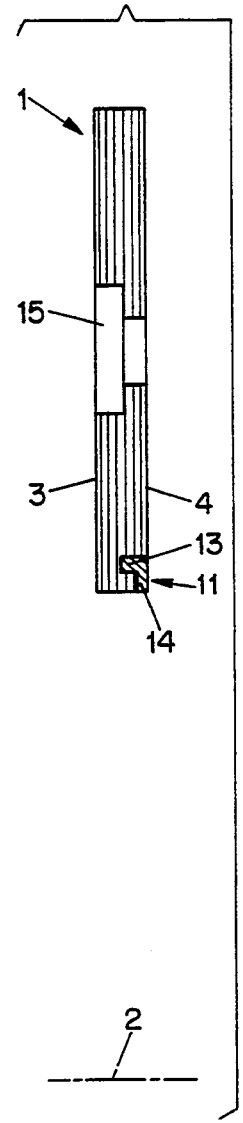

CLUTCH PLATE FOR A FRICTION CLUTCH

BACKGROUND OF THE INVENTION

The invention relates to a clutch plate for a friction clutch and, in particular, a clutch plate with at least one closed reinforcing ring at least partially embedded in the material of the friction lining.

A clutch plate for a friction clutch is known from DE-A-36 43 273, of which the annular disc-shaped friction linings arranged axially on both sides of a carrier disc carry similarly annular disc-shaped reinforcing rings oh their rear and therefore outside the wear volume of the friction lining. The reinforcing rings are sheet metal discs which extend over the radially greatest portion of the friction lining and are riveted together with the friction lining on the carrier disc. The edges of the sheet metal discs are folded and engage in the material of the friction lining. However, the known reinforcing plates are expensive as they have to be punched from large sheet-metal plates and a large amount of waste is therefore generated. Furthermore, they increase the mass moment of inertia of the clutch plate, which is undesirable.

SUMMARY OF THE INVENTION

The invention provides a clutch plate of which the friction linings have only a low mass moment of inertia and may be produced inexpensively while having a high stability of speed.

According to the invention the clutch plate for a friction clutch comprises:
a hub which is coaxial to an axis of rotation;
a carrier disc connected to the hub; annular disc-shaped friction linings being arranged axially on both sides of the carrier disc and connected to the carrier disc, wherein each one of the friction linings carries at least one closed reinforcing ring of a material having higher strength than the friction lining material and being at least partially embedded in the material of the friction lining outside its wear volume. According to the invention the radial dimension of the material cross section of the reinforcing ring is considerably smaller than the radial dimension of the material cross section of the friction lining.

It has been found that the annular part forming the reinforcing ring may be restricted to a relatively small compact cross-sectional area without suffering disadvantages in the rotational stability. At the same time, the production costs as well as the mass moment of inertia are considerably reduced. The lower mass moment of inertia has an advantageous effect on the synchronising devices in the subsequent change-speed gear. It is preferable to arrange the annular part completely outside the region of the rivets holding the friction linings on the carrier part.

According to a further feature of the invention, it is proposed that the annular part forming the reinforcing ring preferably consists of metal. Metal is quite adequate with regard to the strength values required, and processing is unproblematic when metal is used as a basis. However, it is also possible to use other materials such as organic or synthetic fibres which are processed, for example, to a web or to a multi-layered fibre. In each case, this type of material will be more complex and more expensive than metal.

It is also proposed that the annular part has a dimension corresponding to the residual volume in the axial direction. The entire axial width of the friction lining minus its axial wear volume can therefore be used for the arrangement of the annular part.

According to a preferred embodiment of the invention, the annular part has a round cross section. Such a solution is particularly inexpensive as the annular part may, be produced from a piece of round wire which is merely welded into a ring at its two ends.

However, other cross-sectional shapes are also advantageous. Thus, the annular part may be designs, for example, as a dihedron which has emerged from a round wire ring and has two flattened faces in the axial direction of the ring. An annular part of high strength which is particularly inexpensive may be produced with such a dihedron while completely utilising the residual volume.

Furthermore, it is also possible to use the annular part with a rectangular or square cross section. The maximum rotational stability with respect to the available space can be achieved with such a design.

Very high rotational stability may be achieved at the same time as low mass inertia, for example by means of an L-shaped cross section.

In an advantageous embodiment, the annular part is arranged in the region of the external periphery of the friction lining and its external contour corresponds to the external contour of the friction lining. Such a shape is particularly advantageous if the structural strength of the friction lining is quite low.

However, it is also possible to arrange the annular part in the region of the internal periphery of the friction lining, more specifically such that at least part of the radially inwardly directed external contour of the annular part is surrounded by the material of the friction lining. The annular Dart therefore also operates so as to increase the speed of bursting and at the same time has a very low mass moment of inertia.

When an annular part of L-shaped cross section is used and the annular part is arranged in the region of the internal periphery of the friction lining it is proposed that one arm extend parallel to the axis of rotation and the other radially inwardly and that the radially inwardly extending arm ends with the external contour of the friction lining. This arrangement of the annular part ensures that the friction lining is positively held by the annular part when centrifugal force is applied in the region of its greatest tangential tension.

It is also proposed that the friction lining has a slight projection relative to the external contour of the annular part on the rear side opposite the frictional face. This measure is advantageous during production of the friction lining. As the rear of the friction lining has to be machined (surface grinding), grinding should not be carried out into the metal of the annular part during this process as undesirable sparking would otherwise occur. The annular part is therefore set back slightly relative to the machined rear.

The various features of novelty which characterise the invention are pointed out with particularity in the claims annexed to, and forming part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIG. 1 shows a friction lining with a round wire ring as an annular part.

FIG. 2 shows an annular part of square cross section in an enlarged view.

FIG. 3 shows an annular part formed as a dihedron.

FIG. 4 shows an annular part of rectangular cross section.

FIG. 5 shows an annular part of L-shaped cross section arranged radially externally.

FIG. 6 shows an annular part in the form of a round wire ring in the region of the internal diameter of the friction lining.

FIG. 7 shows an annular part of L-shaped cross section arranged radially internally.

DESCRIPTION OF PREFERRED EMBODIMENTS

FIG. 1 shows a friction lining 1 which, for example according to the mentioned prior art, is fastened on a carrier disc 16 which, in turn, rests non-rotatably via a hub 17 on a gearshaft (not shown) capable of rotating round an axis of rotation 2. According to the prior art, two respective friction linings are constructed back to back with interposition of axial suspension. A conventional torsional vibration damper is indicated at 18. Only the left-hand a friction lining is shown completely in the illustration according to FIG. 1. It has a front 3 which simultaneously serves as a frictional face and a rear 4 which rests on the carrier disc 16. Front 3 and rear 4 are usually surface ground and have parallel faces. One of a plurality of rivet openings 15 into which a rivet head of a lining rivet 19 extends is also shown. The friction lining 1 is provided with an annular part or reinforcing ring in the form of a round wire ring 6 in the region of its external periphery. This round wire ring 6 is peripherally closed and inserted into the corresponding mould prior to the pressing process during production of the friction lining 1 and squeezed with the material of the friction lining. The round wire ring 6 considerably increases the structural strength of the material of the friction lining 1 so that much higher speeds can be achieved. The round wire ring 6 is arranged axially such that the complete wear volume of the friction lining 1 is available. This wear volume is produced by abrasion on the front 3, this front 3 penetrating more and more in the service life of the clutch plate. The wear limit is achieved when the front 3 almost coincides with the rivet heads of the rivets 19 in the rivet openings 15. The round wire ring 6 is arranged such that it is not affected when the friction linings 1 are completely worn. The round wire ring 6 is located completely outside the region of the rivets 19.

FIG. 2 shows the arrangement of an annular part 7 of square cross section serving as a reinforcing ring. The enlarged view shows the maximum axial wear volume X which represents one limit for the square wire ring 7. A projection Y beyond the rear 4 is also shown, the rear 4 representing a machined face produced by surface grinding of the original contour 5. The projection Y is to prevent the formation of sparks which could trigger a fire, for example, during the surface grinding of the rear 4 when using metal for the annular part 7. This projection Y is not necessary when using a non-metallic material.

FIG. 3 shows a variation of FIGS. 1 and 2 in which a dihedral annular part 8 is used as a reinforcing ring. This dihedral annular part 8 has the great advantage, on the one hand that a round wire ring which is very economical to produce and is squeezed to the predetermined size between two plane-parallel faces may be used as a basis and on the other hand that high strength may be achieved with the approximately square shape by improved utilising of the residual axial volume of the friction lining material.

In FIG. 4, an annular part 9 in the form of a rectangular cross section is arranged in the friction lining 1 at the external diameter thereof.

FIG. 5 shows an arrangement of an annular part which is L-shaped in cross section. An annular part 10 of L-shaped cross section is arranged in the friction lining 1, one arm 13 extending parallel to the axis of rotation 2 and radially outwardly representing part of the external contour of the friction lining while the other arm 14 is directed radially inwardly and—taking into consideration the projection Y—corresponds to the rear 4. An L-shaped annular part of this type has high inherent stability and is easy to handle during processing.

FIG. 7 shows the arrangement of an L-shaped annular part 11 in the radially internal region of the friction lining 1. The ring 11 is arranged such that its radially inwardly directed arm 14 corresponds to the internal contour of the friction lining 1 and its arm 13 extending parallel to the axis of rotation 2 is generally surrounded by the material of the friction lining. This produces a perfect positive connection in the radially internal region of friction lining 1 so that a clear increase in the bursting speed can be achieved. This annular part simultaneously has a very low mass moment of inertia.

FIG. 6 shows a friction lining 1 in which a round wire ring 12 is also arranged in the radially internal region of the friction lining. This round wire ring 12 has a greater diameter than the internal diameter of the friction lining 1 so it is also substantially surrounded by the material of the friction lining (with the exception of its region extending axially in the direction of the rear 4). This design is particularly economical as the round wire ring 12 is easy to produce. Furthermore, this design is characterised by a low mass moment of inertia.

It goes without saying that several reinforcing rings may also be introduced into each of the friction linings, as indicated, for example, in FIG. 5 for L-shaped annular parts.

While specific embodiments of the invention have been shown and described in detail to illustrate the application of the inventive principles, it will be understood that the invention may be embodied otherwise without departing from such principles.

What we claim is:

1. A clutch plate for a friction clutch comprising: a hub (17) which is coaxial with an axis of rotation (2); a carrier disc (16) connected to the hub (17); and annular disc-shaped friction linings (1) which are arranged axially on both sides of the carrier disc (16) and are connected to the carrier disc (16), each one of the friction linings (1) including an annular disc-like body of friction material having a front surface (3) forming a friction surface, a rear surface (4) adjacent the carrier disc (16), a radially outer peripheral surface and a radially inner peripheral surface and including at least one closed reinforcing ring (6; 7; 8; 9; 10;) of a material having a strength greater than that of the friction material, each said reinforcing ring being at least partially embedded in the friction material of the friction lining (1) in the region of a transition of the outer peripheral surface to the rear surface (4) and outside of a wearing portion of the friction material intended for operational wear and the radial dimension of each said reinforcing ring (6; 7; 8; 9; 10;) being considerably smaller than the radial dimension of the material cross section of the friction lining (1).

2. The clutch plate according to claim 1, wherein the friction linings (1) are connected by rivets (19) to the carrier disc (16), the rivets being located in an annular region of the clutch plate concentric to the axis of rotation and spaced apart from the inner and outer peripheral surfaces of the friction material, and each said at least one reinforcing ring (6; 7; 8; 9, 10) is arranged radially completely outside the region in which the rivets (19) are located.

3. The clutch plate according to claim 1, wherein the axial dimension of each said at least one reinforcing ring (6; 7; 8; 9; 10) is substantially equal to the axial dimension of a non-wearing portion of the friction material adjacent the rear surface that is not intended for operational wear.

4. The clutch plate according to claim 1, wherein said at least one reinforcing ring (6) of each friction lining (16) has a round material cross section.

5. The clutch plate according to claim 1, wherein each said at least one reinforcing ring (7; 9) has a rectangular or square material cross section.

6. The clutch plate according to claim 1, wherein the reinforcing ring (10) has an L-shaped cross section.

7. A clutch plate for a friction clutch comprising: a hub (17) which is coaxial with an axis of rotation (2); a carrier disc (16) connected to the hub (17); and annular disc-shaped friction linings (1) which are arranged axially on both sides of the carrier disc (16) and are connected to the carrier disc (16), each of the friction linings (1) having a disc-like body of friction material and at least one closed reinforcing ring (6; 7; 8; 9; 10) of a material having a higher strength than the strength of the friction material, said at least one reinforcing ring of each friction linings being at least partially embedded a portion in the friction material of the friction lining (1) outside of a wearing portion of the friction material that is intended for operational wear, the radial dimension of each said reinforcing ring (6; 7; 8; 9; 10) being considerably smaller than the radial dimension of the friction material of the friction lining (1), and said at least one reinforcing ring (6; 7; 8; 9; 10) of each friction lining being arranged in the region of the external periphery of the friction lining (1) and having an external contour corresponding to the external contour of the friction lining (1) in the region of a transition from one peripheral face of the friction lining (1) into an adjacent plane face of the friction lining (1).

8. The clutch plate according to claim 7 wherein each said at least one reinforcing ring (6; 7, 8; 9; 10) forms part of a radially outer peripheral face and an adjacent plane face of the friction lining (1).

9. A clutch plate for a friction clutch comprising: a hub (17) which is coaxial with an axis of rotation (2); a carrier disc (16) connected to the hub (17); and annular disc-shaped friction linings (1) which are arranged axially on both sides of the carrier disc (16) and are connected to the carrier disc (16), each of the friction linings (1) having a disc-like body of friction material and at least one closed reinforcing ring (11) of a material having a higher strength than the strength of the friction materials, said at least one reinforcing ring of each friction lining being at least partially embedded a portion in the friction material of the friction lining (1) outside of a wearing portion of the friction material that is intended for operational wear, the radial dimension of each said reinforcing ring (11) being considerably smaller than the radial dimension of the friction material of the friction lining (1), each said at least one reinforcing ring (11) of each said friction lining (1) being arranged in the region of a radially inner periphery of the friction lining (1) and being embedded at least partially into the friction material radially on both sides and having an L-shaped cross section having an arm (13) extending parallel to the axis of rotation and a radially inwardly projecting arm (14) substantially flush with a plane face of the friction lining (1).

10. A clutch plate for a friction clutch comprising: a hub (17) which is coaxial with an axis of rotation (2); a carrier disc (16) connected to the hub (17); and annular disc-shaped friction linings (1) which are arranged axially on both sides of the carrier disc (16) and are connected to the carrier disc (16), each of the friction linings (1) having a disc-like body of friction material and at least one closed reinforcing ring (8) of a material having a higher strength than the strength of the friction material, said at least one reinforcing ring of each friction lining being at least partially embedded a portion in the friction material of the friction lining (1) outside of a wearing portion of the friction material that is intended for operational wear, the radial dimension of each said reinforcing ring (8) being considerably smaller than the radial dimension of the friction material of the friction lining (1), and said at least one reinforcing ring (8) of each friction lining (1) has a cross-section which is defined by mutually parallel flattened surfaces on axially opposed sides but is otherwise round.

11. A clutch plate for a friction clutch comprising: a hub (17) which is coaxial with an axis of rotation (2); a carrier disc (16) connected to the hub (17); and annular disc-shaped friction linings (1) which are arranged axially on both sides of the carrier disc (16) and are connected to the carrier disc (16), each of the friction linings (1) having a disc-like body of friction material and at least one closed reinforcing ring (10; 11) of a material having a higher strength than the strength of the friction material, said at least one reinforcing ring of each friction lining being at least partially embedded a portion in the friction material of the friction lining(1) outside of a wearing portion of the friction material that is intended for operational wear, the radial dimension of each said reinforcing ring (10; 11) being considerably smaller than the radial dimension of the friction material of the friction lining (1), and said at least one reinforcing ring (10; 11) of each friction lining (1) has an L-shaped cross section.

12. A clutch plate for a friction clutch comprising: a hub (17) which is coaxial with an axis of rotation (2); a carrier disc (16) connected to the hub (17); and annular disc-shaped friction linings (1) which are arranged axially on both sides of the carrier disc (16) and are connected to the carrier disc (16), each of the friction linings (1) having a disc-like body of friction material and at least one closed reinforcing ring (7; 8) of a material having a higher strength than the strength of the friction material, said at least one reinforcing ring of each friction lining being at least partially embedded a portion in the friction material of the friction lining (1) outside of a wearing portion of the friction material that is intended for operational wear, the radial dimension of each said at least one reinforcing ring (7; 8) being considerably smaller than the radial dimension of the friction material of the friction lining (1), the friction material of each friction lining having a non-wearing portion not intended for operational wear adjacent the carrier disc (16), and said at least one reinforcing ring (7; 8) of each friction lining (1) being metallic and being recessed into said non-wearing portion such that its side closest to the carrier disc (16) is spaced apart from the carrier disc (16).

* * * * *

UNITED STATES PATENT AND TRADEMARK OFFICE
CERTIFICATE OF CORRECTION

PATENT NO. : 5,373,928
DATED : December 20, 1994
INVENTOR(S) : Karl H. Werner, Hilmar Goebel and Bernhard Schierling It is certified that error appears in the above-indentified patent and that said Letters Patent is hereby corrected as shown below:

Col. 1, line 13, "oh their" should read --on their--;
Col. 2, line 9, "may, be" should read --may be--;
Col. 3, line 28, "a friction" should read --friction--;
Col. 5, line 41, "linings" should read --lining--;
Col. 5, line 68, "materials" should read --material--.

Signed and Sealed this

Eighteenth Day of April, 1995

Attest:

BRUCE LEHMAN

Attesting Officer

Commissioner of Patents and Trademarks